(12) United States Patent
Buendia et al.

(10) Patent No.: US 8,185,483 B2
(45) Date of Patent: May 22, 2012

(54) SYSTEM FOR DESIGN AND USE OF DECISION MODELS

(75) Inventors: Axel Buendia, Pré Saint Gervais (FR); Jerome Hoibian, Paris (FR)

(73) Assignee: Jerome Hoibian, Paris (FR)

( * ) Notice: Subject to any disclaimer, the term of this patent is extended or adjusted under 35 U.S.C. 154(b) by 1148 days.

(21) Appl. No.: 10/562,008

(22) PCT Filed: Jun. 25, 2004

(86) PCT No.: PCT/FR2004/001627
§ 371 (c)(1),
(2), (4) Date: Apr. 8, 2008

(87) PCT Pub. No.: WO2005/001758
PCT Pub. Date: Jan. 6, 2005

(65) Prior Publication Data
US 2008/0208544 A1    Aug. 28, 2008

(30) Foreign Application Priority Data
Jun. 27, 2003   (FR) ...................................... 03 07826

(51) Int. Cl.
*G06F 15/18* (2006.01)
(52) U.S. Cl. .......................................................... 706/14
(58) Field of Classification Search .................... 711/173
See application file for complete search history.

(56) References Cited

U.S. PATENT DOCUMENTS
6,266,751 B1 *   7/2001   Niescier ........................ 711/173
2004/0054638 A1   3/2004   Agami et al.

OTHER PUBLICATIONS

'Modelling fish behaviour': Stephens, 2003, ACM, 1-58113-578, pp. 71-78.*
'Towards digital creatures in real time 3d games': Buendia, Springer Verlag, VW 2000, LNAI 1834, pp. 44-53.*
'SAM: a model to design computational social agents': Bouron, ONERA Artificial Intelligence Group (DMI).*

* cited by examiner

*Primary Examiner* — Kakali Chaki
*Assistant Examiner* — Peter Coughlan
(74) *Attorney, Agent, or Firm* — Roylance, Abrams, Berdo & Goodman, L.L.P.

(57) ABSTRACT

The invention relates to a system for the design and use of decision models. More specifically, the invention relates to an automatic method for decision making by a virtual or physical agent on the basis of external variables derived from an environment described by a digital model or physical sensors and variables internal to the agent described by digital parameters, and to decision-making means which control the actions of the agent. The invention is characterized in that the decision-making means determines the parameters of at least one action of the agent on the basis of at least one part of the internal or external variables. According to the invention, the operation consisting in determining the parameters of an action is performed by several decision sub-processes which are each a function of at least part of the external and internal variables. Moreover, said operation processes a limited part of the general decision problematic, the parameters determined by each of the aforementioned sub-processes being processed in order to construct the set of action parameters which control the agent.

40 Claims, 5 Drawing Sheets

SYSTEM FOR DESIGN AND USE OF DECISION MODELS

The present invention relates to the field of artificial intelligence and more particularly to the field of decision models.

The present invention relates more particularly to a system for design and use of decision models, a decision model being a mathematical model capable of making decisions. The system according to the present invention has applications in the field of video games, this example remaining of course non-limiting.

There is already known in the prior art, through the French patent application FR 2811449 (Mathématiques Appliquées S.A.), an automatic system for decision-making by a virtual or physical agent. This automatic system for decision-making by a virtual or physical agent according to external variables coming from an environment described by a numerical model, and variables internal to the agent described by numerical parameters, comprises means of selecting actions to be carried out by the agent using a variation of one or more of said variables. The numerical parameters describing the virtual or physical agent comprise numerical data representing the motivation of the agent. The selection of actions of the virtual or physical agent is also a function of the value of said data representing the motivation of the agent. The system presented in this PCT patent application has the drawback of not dealing solely with the problems of binary choices of actions. For example, this system is not capable of choosing parameters used for carrying out actions. Another disadvantage of the Mathématiques Appliquées solution compared with the present invention is not optimising the computing resources made available.

The present invention intends to remedy the drawbacks of the prior art by proposing an automatic system for optimal management of the software and hardware resources used. The system according to the present invention in addition makes it possible to determine an ideal set of parameters for each action.

To that end, the present invention concerns, in its most general sense, an automatic method for decision-making by a virtual or physical agent according to external variables coming from an environment described by a numerical model or by physical sensors, and variables internal to the agent described by numerical parameters, and decision-making means controlling the actions of said agent, characterised in that said decision-making means determines the parameters of at least one action of said agent, according to at least some of the internal or external variables, said operation of determining the parameters of an action being carried out by several decision subprocesses which are each a function of at least some of said external and internal variables, and dealing with a limited part of the general decision problems, the parameters determined by each of said subprocesses being processed in order to construct the set of action parameters controlling said agent.

Advantageously, some internal variables are numerical values representing perception.

According to a particular embodiment, some internal variables are numerical values representing motivation.

According to a variant, some external variables are numerical values representing opportunity.

Preferably, calculation of the parameters, motivations and opportunities is performed by a tree of processing blocks, each processing block corresponding to a function receiving input variables comprising some of the internal variables, and external variables and output variables of one or more upstream processing blocks.

Advantageously, said processing blocks comprise logical operators, expert systems and mathematical operators.

Preferably, the method comprises a means of interrupting said parameter-determining operation consisting of controlling the action of the agent with the parameters determined using the subprocesses processed before the interruption.

Advantageously, activation of the interruption means is controlled according to the state of a processing counter decremented by the cost of each processing block used.

Preferably, the cost of a processing block is determined by a numerical parameter representing the machine time necessary for executing the processing of said block.

Advantageously, said numerical parameter representing the machine time is determined relatively with respect to the costs of at least some of the other blocks.

According to a particular embodiment, said interruption means is controlled by a function of the master system.

Preferably, the method comprises steps for interrogating the master system after each determination of a parameter set for an action, and for activating said interruption means according to the response of the master system to this interrogation.

Preferably, the method comprises means of arranging the subprocesses in decreasing order of activation.

Advantageously, the method comprises means of recording the state of the calculation trees, actuators and subprocesses at the time of the interruption, and means for continuing the decision process using the recorded information.

According to a variant, several agents are controlled from a common decision model, said decision model comprising a means of recording the information specific to each agent.

Advantageously, the method does not comprise steps for dynamic memory allocation during the processing of the decision model.

Preferably, the method comprises means of processing logical dependencies between the subprocesses.

Advantageously, said means of processing logical dependencies consists of modifying the activation of the master subprocess or subprocesses according to the highest activation of the dependent subprocesses.

Preferably, the method carries out the processing of multi-valued external variables originating from different perceived objects of the environment.

According to a particular embodiment, the output values of a processing block are memorised during the processing cycle if they are used by another subprocess.

Advantageously, said output values are recorded in a memory common to several processing blocks.

Preferably, the method comprises a means of recalculating one or more outputs of a processing block where the common memory is saturated.

Preferably, the method comprises a means of implementing a behavioural detail level.

Advantageously, the method comprises a convergent adaptation mechanism irrespective of the nature of the learning signal.

According to a particular embodiment, learning is carried out by a stochastic process based on the FISK distribution.

Preferably, the method comprises means of grouping and recording memories consisting of information corresponding to perceptions or to calculation tree results.

Advantageously, the method comprises a step of grouping memories in the form of strata.

Advantageously, the method comprises a recognition step consisting of selecting the active memories.

According to an advantageous variant, the method comprises an operation of creating a new memory in the case of absence of perfect recognition.

Advantageously, the method comprises an operation of updating the active memories by replacing the memorised information by the state of the calculated information.

Preferably, the method comprises an operation of calculating the reliability of the information of the updated memories.

According to a particular embodiment, the method comprises means of connection between the memories and the actuators of the stratum.

Advantageously, the connection is performed by virtue of generic calculation trees, common to all the memories and using the information of the memory.

According to a variant, the method comprises means of linking between the memories for the creation of influences between the memories.

According to a variant, the method comprises a step of propagating influences between the memories by means of links.

According to a particular embodiment, the method comprises optimisation of updates of influences limited to the influences which have undergone a change.

According to a particular embodiment, the method comprises a step of transmitting modified information to the rest of the decision model.

Advantageously, the method comprises a means of transmitting modified information by the creation of a virtual object.

Preferably, the method comprises a means of transmitting modified information by overloading the result of a processing block.

Preferably, the method comprises a mechanism for automatic management of the number of memories used consisting of deleting the least useful memory.

According to an advantageous variant, said mechanism for automatic management of the number of memories can be customised at the design stage.

Advantageously, the method comprises a mechanism for automatic management of the number of links used consisting of deleting the least useful link.

The invention will be better understood with the help of the description, given below purely by way of explanation, of one embodiment of the invention, with reference to the accompanying figures.

The architecture of the system according to the invention is based on the notion of structural and functional formalism. The model is described by its structure and a given number of functional symbols.

First a few definitions of functional symbols will be given in order to facilitate understanding of the description of one embodiment of the invention.

Hereinafter, the following names will be used:

Interest centre: a subprocess dealing with only a single aspect of the decision problem;

Order: a result originating from an interest centre comprising a value describing its interest for the decision process, from 0 to n parameters describing the way of executing the order, and possibly a reference to a target object of the order.

In the remainder of the description, actions or actuators describe the solutions of the decision model and perform the processing operations for determining the optimum order.

Perceptions or sensors make it possible to retrieve the information coming from the master system, essential for the processing operations of the interest centres.

Processing block or specific processing module means a block performing a mathematical function.

Each interest centre has linked to it the notion of motivation. This measures the interest of the decision model in satisfying the corresponding interest centre.

For each of the actuators to which an interest centre is linked, the opportunity is defined as the measure of the interest of an external element (belonging to the environment) for the corresponding interest centre.

For each of the actuators to which an interest centre is linked, a finite number of parameters are defined, representing the configuration to be used for implementing the actuator for the corresponding interest centre. A parameter can also be described as intensity.

The interest of the order is the product of the motivation of the interest centre and the opportunity. It can therefore be different for each pair (interest centre, actuator).

Figure 1:
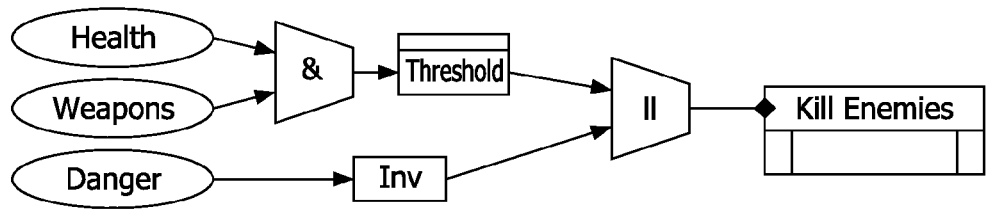
FIG. 1 illustrates the structured factorisation of calculation trees.

All the values (motivation, opportunity, parameter) are calculated by calculation trees. These calculation trees are tree-type graphs whose root designates the value to be calculated and the leaves the values used (perceptions) for this calculation. These calculation trees can perform mathematical functions on the incoming information (perceptions) by means of processing blocks. The structure of the tree thus determines the set of calculations to be performed. Through the graphical nature of the design, the calculations are factorised by reusing a processing block in several calculation trees. This makes it possible to keep the minimum structure (totally factorised) of the calculations. This is illustrated in FIG. 1.

Figure 2:
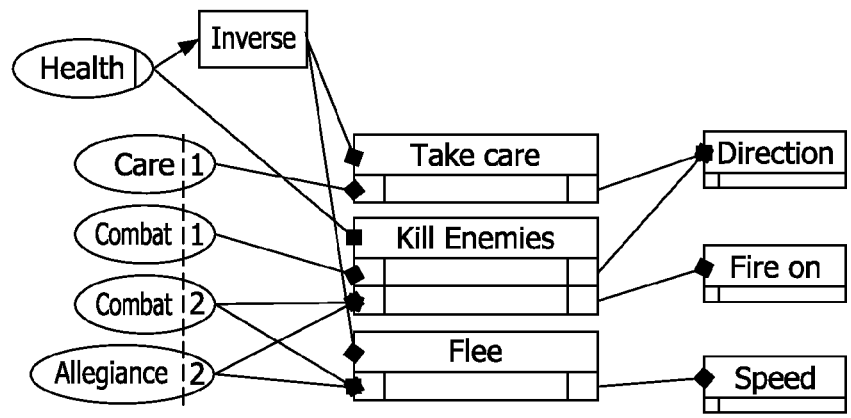
FIG. 2 illustrates the use of a perception group.

In the example here, the perceptions can be represented by a list of objects, it being possible to describe each object by a finite set of perceptions. The objects described by the same perceptions belong to the same object class. The set of perceptions describing an object class forms a perception group, as illustrated in FIG. 2.

For obvious reasons of resource saving, the decision models cannot directly process combinations of objects. This is because, if n objects are perceived, $n^2$ combinations would have to be processed. However, it is possible to process certain of these combinations by associating one of the two objects of the combination with an interest centre, which will then be responsible for evaluating the combinations possible with this object.

It is said that there is a logical dependency between two interest centres (A dependent on B) when:

B is connected to an actuator ACT;

ACT modifies the processing performed by a calculation tree used by A.

Cyclic logical dependencies are automatically cut by the system; taking the dependency into account will take place only at the next cycle. The cutting is performed once only, upon loading of the decision model.

A set of actuators and a set of interest centres form a layer if they are isolated from the other interest centres and actuators, or if their only links are logical dependencies.

Figure 3:
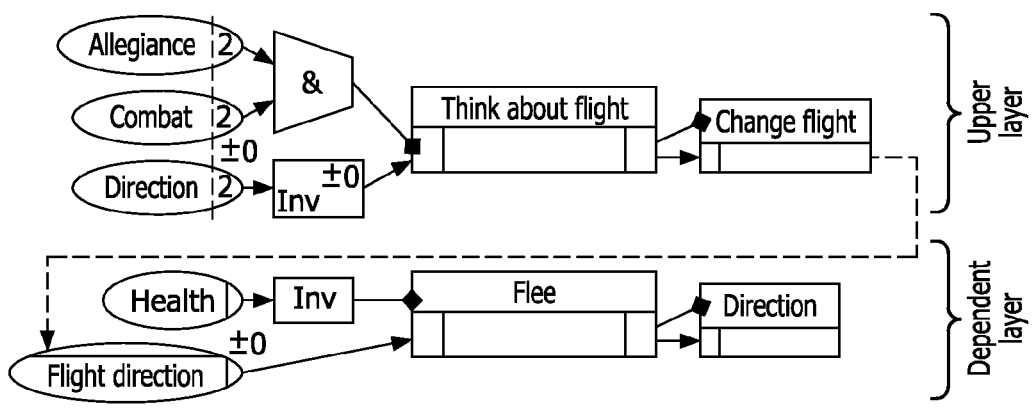
FIG. 3 illustrates the notions of logical dependency and layer.

FIG. 3 illustrates the notions of layer and logical dependency.

When a layer A has its processing modified by another layer B (logical dependency) through an actuator ACT, it is said that B is the master of A. It is considered that B sends orders to A. For resource-saving reasons, it is possible to force the actuator to call a function of the master system, this operation then replacing the modification of the layer A. It is then said that A is more detailed than B. Two levels of behavioural detail are thus created. An adapted mechanism put in place within the actuator then makes it possible, upon use of the model, to specify the desired level of behavioural detail.

The use of the decision model to obtain a decision is referred to as the "reflection cycle". During the reflection cycle, the information supplied to the decision model is constant.

Activation represents the importance to the decision model of processing the corresponding interest centre. It is determined by integrating the motivation of the interest centre with respect to time (the reflection cycles). It is reset to zero when the interest centre is processed. It favours the execution of all the interest centres according to the history of their motivation.

Certain interest centres are automata; they do not possess motivation (no activation). They inherit the strongest activation of the dependent interest centres. To this inheritance there is added an "epsilon"
(a positive number very close to zero). This mechanism guarantees that the automatic dependencies (master automaton interest centres) are processed before the dependent interest centres.

Motivation is not connected to a perception group, since it relates to the internal state of the entity under consideration using the decision model belonging to the master system. Thus, the motivation and then the activation can be calculated quickly.

The decision model implements a step of sorting the interest centres according to their activation. The interest centres are then processed in this order, from the strongest activation to the weakest. This system makes it possible to obtain coherent decisions even if the decision process is interrupted before all the interest centres have been processed. Thus, the processing operations carried out within the system display an interruptible nature whilst maintaining some coherence.

The processing operations carried out within the system according to the invention are mainly implemented by the interest centres. The main objective of the interest centres is to calculate the orders transmitted to the actuators to which they are connected. To do this, they use the calculation trees defined at the decision model design stage.

The other processing operations are carried out within the actuators. They concern the management of the received orders.

Each actuator formalises part of the desired result. As the actuators are independent of one another, a local mechanism is sufficient for determining a result satisfying all the decision criteria. A step of dialogue between the actuators is therefore not
necessary, which naturally leads to optimisation of the calculations implemented.

A local mechanism for influence between the orders allows the actuator to determine a global solution. In order to measure the influence of an order A on an order B, the actuator calculates the complementarity of A with regard to B. This complementarity is between 0 (incompatible orders) and 1 (totally complementary orders). It weights the interest of A received by B. Complementarity is calculated by calling upon a function defined in the master system.

The order which, after influence, has the highest interest will be executed. Before that, it is necessary to calculate the optimum values of its parameters. Each parameter is described by three values:

the initial value p of the parameter;
a value m representing a margin in which the values of the parameter are considered to be ideal;
a value s representing a safety margin in which the values of the parameter are eligible but of less interest.

Figure 4:
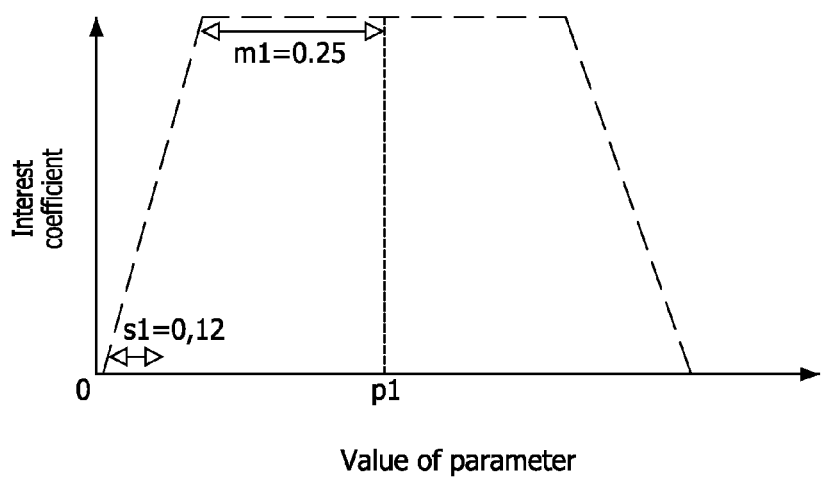
FIG. 4 illustrates the set of values linked to a parameter.

FIG. 4 depicts the set of possible values described by (p, m, s).

The optimum value of each parameter is between (p−m−s) and (p+m+s). The interest is used as the selection criterion. For each possible value, the cumulative interest (coming from different orders) is calculated. The optimum value is then designated by the value having the largest cumulative interest. If a segment is concerned, either one of the two end values or the value corresponding to the centre of the segment is selected.

Figure 5:
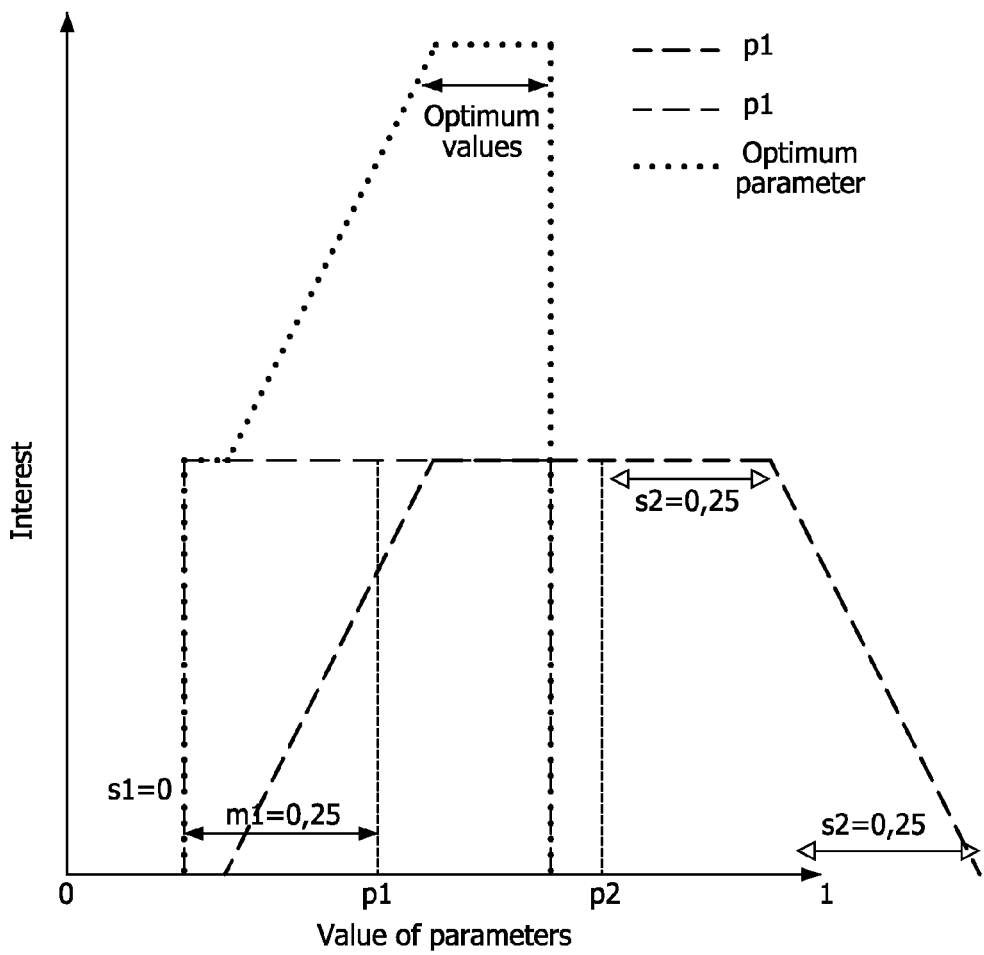
FIG. 5 illustrates the determination of the optimum value of a parameter.

FIG. 5 illustrates the calculation of the optimum value of a parameter.

For reasons of memory cost, each actuator can manage only a limited number of orders (a number fixed by the user at the design stage). An internal method of merging orders makes it possible to comply with this limit without losing too much information. This method deletes the order which is of least interest and has the highest complementarity. Its influence on the order to which it is complementary is permanently integrated into the latter. In other words, it is a question of determining the pair of orders (A, B) for which the complementarity is highest. The order A is then deleted and the order B is modified in order to take into account the interest of A. If two pairs (A, B) and (C, D) have the same complementarities, the one out of A or C which has the lowest interest is deleted.

Each actuator incorporates a notion of persistency. There are three possible types of persistency, which modify its operation:
Volatile: orders are executed directly as soon as they are received by the actuator without any influence mechanism intervening. They are then erased from the system.
Persistent: orders are kept only during the reflection cycle. They are erased at the beginning of each new cycle.
Static: orders are kept between reflection cycles. With each order there is associated a particular calculation tree referred to as satiety (between 0 and 1). At the beginning of each new cycle, complementarity at 1 of the value of the satiety weights the interest of the order. If the satiety is high, the interest is low, which brings about merging of the order. An order with zero interest is erased immediately.

After having described the action selection mechanism, particular attention will be given in a second part to examining the adaptation mechanism.

The adaptation mechanism put in place is localised and controlled:
Localisation: The adaptation mechanism is implemented at the level of certain particular processing blocks referred to as "adaptive processing blocks". Thus, only the calculation trees using these blocks will be capable of adapting.

Control: The adaptation mechanism is activated by a particular actuator referred to as "supervising". Its parameters each represent a judgement passed on the current situation.

The judgement or learning signal is represented by a value capable of being of three different kinds:

Failure: the higher the value, the more unfavourable is the judged situation.

Success: the higher the value, the more favourable is the judged situation.

Dichotomous failure: in addition to measuring a failure, the judgement provides an indication on the sense of the adaptation. This kind can be used only for calculation trees linked to the parameters (with an exact value and not a relative value, the latter describing motivation and opportunity).

The mathematical nature of the judgement (continuous or discrete, simple or dichotomous) significantly influences the convergence of the adaptation. The adaptation mechanism put in place at the adaptive processing block must work absolutely irrespective of the kind of judgement received.

Adaptation within the adaptive processing blocks is performed by varying the learning parameters. These parameters are used during the processing performed by the block. By varying them, this processing is modified. The possible values of these parameters must belong to a finite, bounded and ordered set.

Each adaptive processing block is characterised by a reliability which measures the suitability of the block to the situations encountered. It is between 0 and 1. It is calculated in accordance with the following formula:

Let e be the measured error $$Reliability_{n+1} = \frac{Reliability_n * n + 1 - e}{n+1}$$

If AbsVal(Reliability$_{n+1}$–Reliability$_n$)>ϵ, then n=n+1.

The new value of a learning parameter is calculated according to the formula:
Let e be the error associated with the signal;
Let f be the reliability of the block;
Let a be the current value of the parameter;
Let p be a random number between 0 and 1;

$$Value = a + e * (1-f) * \sqrt{\frac{p}{1-p}}$$

The new value thus calculated follows the so-called Fisk distribution, which can be made symmetrical.

Let three examples of learning blocks be considered:
The weighting learning block
The pluri-linear learning block
The neural learning block.

The weighting learning block has only a single learning parameter. This block has two operating modes depending on whether or not it has an input:

Weighting mode: if the block has an input, it then weights its input by its learning parameter (product);

Generation mode: if the block does not have an input, it simply returns its learning parameter, as if its input were 1.

The learning of the learning parameter is performed simply by applying the previous instructions to the letter. When the block receives a learning signal:

It uses the mean of the reference input values;
The learning reference is obtained by multiplying this mean by the current learning parameter;
The scale is obtained conventionally as a function of the reliability and the signal;
The new learning parameter is obtained by dividing the learned value by the mean of the reference input values.

Let i be the mean of the reference input values;
Let w be the value of the learning parameter;
Let e be the error associated with the signal;
Let f be the reliability of the learning block;
Let w' be the new value of the learning parameter;
Let a be the localisation;
Let b be the scale;
This gives:
a=w*i
b=e*(1−f)
w'=(a+b*Fisk)/i
for any non-zero i.

As regards the pluri-linear learning block, the concept is to break down the ideal function into a set of segments, referred to as learning segments. Each learning segment approximates a continuous portion of the ideal function. It has its own learning parameters: gradient and ordinate at the origin. This learning block thus groups together several learning parameters: the gradients and ordinates at the origin of the learning segments.

Let a be the gradient;
Let b be the ordinate at the origin;

$$y=a*x+b$$

Each learning segment comprises two definition limits. It records a mean of the input values used corresponding to its definition limits.

Figure 6:
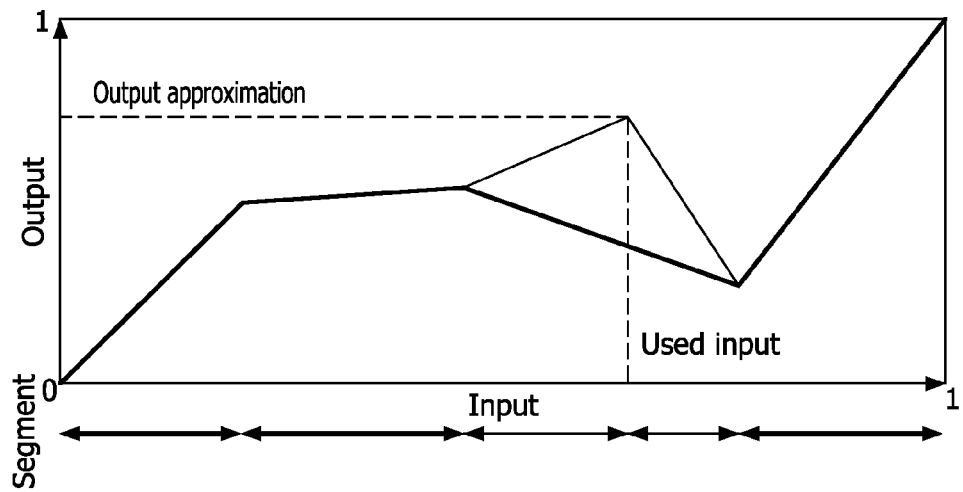
FIG. 6 depicts the creation by splitting of a new learning segment.

The segment calculates the ideal output value as previously. The memorised input value in fact corresponds to the mean of the input values used. A new learning point is created. The learning block then performs a split of the learning segment concerned at the input point used. It thus creates two learning segments from a single one. FIG. 6 summarises the operation of this split.

The learning parameters are then calculated as follows:
Let x1 and y1 be the coordinates of the first learning point;
Let x2 and y2 be the coordinates of the second learning point;
Let a be the gradient of the linear equation;
Let b be the ordinate at the origin of the linear equation;

$$a=(y2-y1)/(x2-x1) \text{ if there are two learning points}$$

$$a=0 \text{ otherwise}$$

$$b=x1*a+y1 \text{ if there is one learning point}$$

$$b=0 \text{ otherwise}$$

The maximum number of segments is defined at the design stage.

When this number is exceeded, the learning block carries out a "merger". The merger consists of choosing one of the points delimiting two learning segments and eliminating it. The two adjacent segments then recalculate their learning parameter accordingly. The merger corresponds to a loss of information for the block. It will therefore minimise this loss. This loss is linked to several factors:

Reliability of the learning segment: the more reliable the segment is, the less preferable it is to modify it;

Surface area of the triangle formed by the ends of the new segment and the point to be eliminated: this surface area represents the information lost during the lost elimination of the point concerned.

It is calculated in accordance with the following formula:
Let f be the reliability;
Let l be the difference between the abscissae;
Let h be the difference between the ordinates;

$$\text{Information} = (1/2)*f*l*h$$

Figure 7:
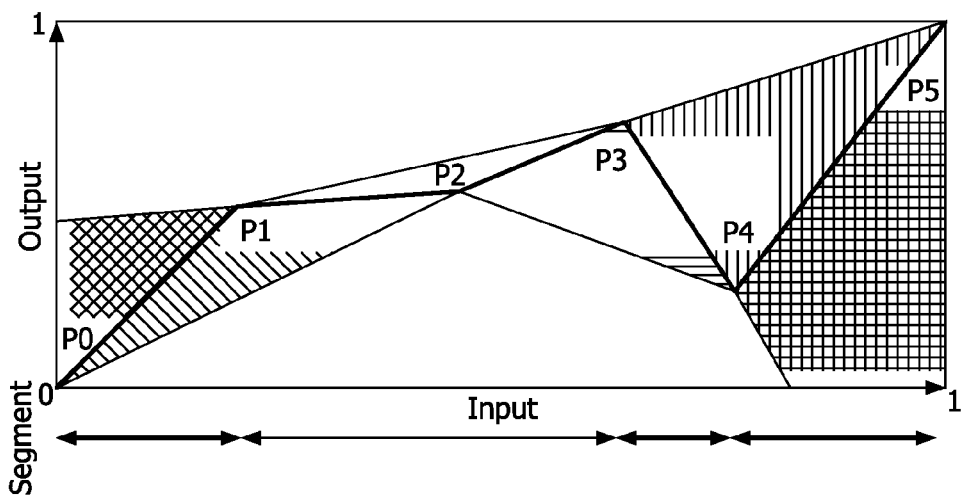
FIG. 7 depicts the determination of two learning segments to be merged.

FIG. 7 shows how this merger process is applied.

The neural learning block breaks down into two functions. The first uses the learning parameters to weight the inputs of the block: one learning parameter per input. It combines them by performing a sum. The second makes it possible to threshold the output. By default, this output is a sigmoid.
Let $f_{mod}$ be the function for modifying the result;
Let $f_{comb}$ be the function for combining the inputs;
Let k be the steepness of the sigmoid;

$$f_{mod}(x) = (\exp(k*x) - 1)/(\exp(k*x) + 1)$$

$$f_{comb}(x) = \sum_j input_i * w_i$$

Learning is performed for each input. The learning signal received by the learning block is therefore used by all the inputs. The learning reference is the mean of the values used since the last learning signal. The scale is calculated as previously.

The result of the learning is then a new value for the learning parameter. Two major operational differences distinguish the neural learning block from a conventional neuron:

The use of reliability: neural networks use a similar learning factor, inherited from simulated baking methods (then referred to as temperature). Reliability makes it possible to replace this parameter advantageously. This is because its value depends on the learning signals received, and is therefore not arbitrary.

Stochastic learning: it is possible to make the neural learning block non-stochastic. However, convergence can then come up against the dearth of certain learning signals. Conventional neural networks in fact use a continuous learning signal measuring failure.

After having described the action selection and adaptation mechanisms, modelling and dynamic planning will be studied.

Two concepts allowing the creation of a model as rich as desired are distinguished:

Memory: this makes it possible to memorise a set of information. This set represents a concept of the master system. Each of these information sets describes a memory class.

Link: this makes it possible to describe the influences which modify the interlinked memories.

In reality the link is similar to an actuator which will modify the information of a memory. These modifications are created by the memories which will therefore send orders to the link actuator. Memories are therefore interest centres.

Each memory belongs to a given class which specifies the information it contains. These classes are referred to as memory classes. All memories belonging to the same class form a memory stratum.

Memories belonging to the same stratum are created by an actuator referred to as a "memorise actuator". Each of these parameters determines the value of an item of information of the memory.

The information memorised in a memory comes from calculation trees. It therefore originates more or less directly from percipients.

During its execution, the "memorise actuator", proposes to the existing memories the creation of a new memory. Each existing memory will then attempt to identify itself in the proposed memory: this is the recognition step.

Reference object of the memory or more simply reference of the memory is the name given to an identifier coming from the master system and designating the source object which is at the origin of the memory.

Recognition is performed by means of a specific calculation tree referred to as a recognition tree, designed for each memory stratum. In the event of this tree being absent, the system carries out a direct recognition by reference.

If no memory recognises itself perfectly in the proposed memory, a new memory is created. This new memory therefore identifies itself perfectly with the proposed memory.

All memories succeeding in identifying themselves, even partially, with the proposed memory become the active memories. These memories cannot transmit their influence to the other memories. They are the receptacles of influences of the other memories.

The active memories modify their information in order to match the proposed memory perfectly. This step corresponds to updating the memories.

Each information item groups together three distinct values:

Memorised information (reference information): this value corresponds to the result of the calculation tree at the time of the last memorising.

Modified information (loaded information): this value corresponds to the memorised information (reference information), modified by the linked memories.

Reliability of the information: this value makes it possible to measure the stability over time of the memorised information. It is calculated in accordance with the following formula:
Let e be the measured error $$Reliability_{n+1} = \frac{Reliability_n * n + 1 - e}{n + 1}$$

If AbsVal($Reliability_{n+1}$−$Reliability_n$)>ϵ, then n=n+1.

The overall reliability of a memory is calculated by performing the mean of the reliabilities of its information items.

At the time they are created, the memories are automatically connected to the actuators present in the stratum. These actuators are referred to as "stratum actuators".

The calculation trees necessary for calculating orders can use the information of the memories by virtue of specific percipients. These calculation trees are referred to as generic, since they are shared by all the memories.

The source object of an order sent to a stratum actuator is always the reference of the memory which is at the origin of this order.

Amongst the stratum actuators, the "link actuators" make it possible to create a link to a target memory. A single linked actuator makes it possible to manage all the target memories. These actuators are generic actuators. At each creation of a new memory, the corresponding linked actuator is updated.

Figure 8:
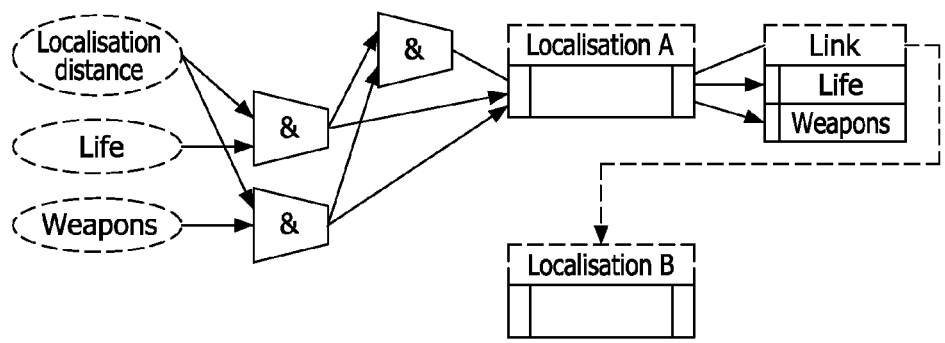
FIG. 8 illustrates the mechanism for influence between two memories by means of a link.

Links allow one memory to influence another, that is to say modify its information (the information is then referred to as loaded), as illustrated in FIG. 8.

The links for which the target is an active memory do not propagate their influence to this memory. On the other hand, they use their influence to modify the layer which is going to use the memories. This modification can take two forms:
creation of a virtual object: a new object which does not really exist in the master system will be created and perceived by the layer;
overloading of a processing block; the result of a processing block used by the layer is replaced; the system is then updated automatically.

Figure 9:
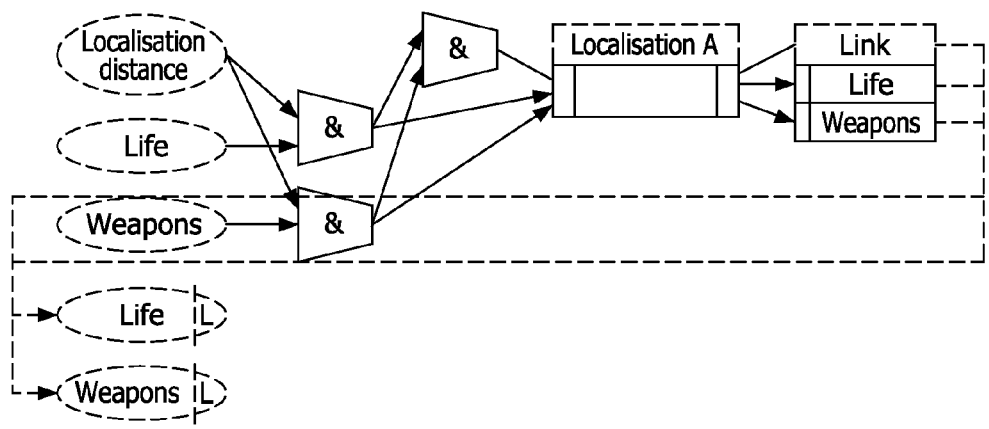
FIG. 9 illustrates the mechanism for creation of a virtual object by a link.

FIG. 9 depicts the creation of a virtual object by a link.

Calculation of all the influences is a long calculation, with a complexity of the order of $n^2$, n being the number of memories.

However, the system is capable of managing only the necessary updates, corresponding to a change of active memories or a modification of the information of
a memory. This method therefore guarantees an incremental processing which can be distributed over time.

The memory strata are capable of automatically managing the memory resources they use. The creation of memories and links having already been tackled, a specific stratum actuator referred to as a "forget actuator" makes it possible to manage their destruction.

It is important to note that this actuator exists, whether or not it was created at the design stage. Its default behaviour consists of eliminating the memory and/or the link which is least useful.

The usefulness of a memory depends on two main factors:
the opportunity calculated at the time of creation or last update of the memory makes it possible to know its usefulness to the decision model;
the number of updates of the memory weighted by its reliability makes it possible to know the "certainty" of the memory.

The usefulness of a memory is therefore calculated in accordance with the following formula:

$$\text{Usefulness} = (\text{Opportunity}) * (\text{Reliability}) * (\text{Number of updates})$$

The usefulness of a link depends on two factors:
usefulness of the target memory;
opportunity calculated for the creation of the link, which measures the interest of this link for the decision model.

The usefulness of a link is therefore calculated in accordance with the following formula:

$$\text{Usefulness} = (\text{Opportunity}) * (\text{Usefulness}(\text{Target memory}))$$

It is possible at the design stage to specify a "forget actuator". This actuator has
a single parameter which determines a percentage of the reliability of the memory to be kept.

The invention is described above by way of an example. It should be understood that persons skilled in the art are able to implement different variants of the invention without for all that departing from the scope of the patent.

The invention claimed is:

1. An automatic method for decision-making by a virtual or physical agent according to
external variables coming from an environment described by a numerical model stored in memory means of the agent or by physical sensors connected to said agent,
variables internal to the agent described by numerical parameters stored in the memory means of the agent, and
processing means of the agent called decision-making means controlling actuators of said agent, characterised in that said decision-making means determines the parameters of at least one action of said agent, according to at least some of the internal or external variables, the operation of determining the parameters of an action being carried out by subprocessing means, called interest centre, which performs several decision subprocesses, each subprocess consisting in calling a processing block which performs a function of at least some of said external and internal variables, and each actuator dealing with a limited part of the general decision problems, the parameters determined by each of said subprocesses being processed in order to construct the set of action parameters controlling said agent,
the automatic method further comprising interrupting said operation of determining parameters, by means of interrupting means, the interrupting step consisting of controlling the action of the agent with the parameters determined using the subprocesses processed before the interruption, activation of the interruption means being further controlled according to the state of a processing counter decremented by the cost of each processing block used.

2. An automatic method according to claim 1, characterised in that some internal variables are numerical values representing perception.

3. An automatic method according to claim 1, characterised in that some internal variables are numerical values representing motivation.

4. An automatic method according to claim 1, characterised in that some external variables are numerical values representing opportunity.

5. An automatic method according to claim 1, characterised in that calculation of the parameters, motivations and opportunities is performed by a tree of processing blocks, each processing block corresponding to a function receiving input variables comprising some of the internal variables, and external variables and output variables of one or more upstream processing blocks.

6. An automatic method according to claim 5, characterised in that said processing blocks comprise logical operators, expert systems and mathematical operators.

7. An automatic method according to claim 5, characterised in that the output values of a processing block are memorised during the processing cycle if they are used by another subprocess.

8. An automatic method according to claim 7, characterised in that said output values are recorded in a memory common to several processing blocks.

9. An automatic method according to claim 8, characterised in that it comprises a means of recalculating one or more outputs of a processing block where the common memory is saturated.

10. An automatic method according to claim 1, characterised in that the cost of a processing block is determined by a numerical parameter representing the machine time necessary for executing the processing of said block.

11. An automatic method according to claim 10, characterised in that said numerical parameter representing the machine time is determined relatively with respect to the costs of at least some of the other blocks.

12. An automatic method according to claim 1, characterised in that said interruption means is controlled by a function of the master system.

13. An automatic method according to claim 1, characterised in that it comprises steps for interrogating the master system after each determination of a parameter set for an action, and for activating said interruption means according to the response of the master system to this interrogation.

14. An automatic method according to claim 1, characterised in that it comprises means of arranging the subprocesses in decreasing order of activation.

15. An automatic method according to claim 1, characterised in that it comprises means of recording the state of the calculation trees, actuators and subprocesses at the time of the interruption, and means for continuing the decision process using the recorded information.

16. An automatic method according to claim 1, characterised in that several agents are controlled from a common decision model, said decision model comprising a means of recording the information specific to each agent.

17. An automatic method according to claim 1, characterised in that it does not comprise steps for dynamic memory allocation during the processing of the decision model.

18. An automatic method according to claim 1, characterised in that it comprises means of processing logical dependencies between the subprocesses.

19. An automatic method according to claim 18, characterised in that said means of processing logical dependencies consists of modifying the activation of the master subprocess or subprocesses according to the highest activation of the dependent subprocesses.

20. An automatic method according to claim 1, characterised in that it carries out the processing of multi-valued external variables originating from different perceived objects of the environment.

21. An automatic method according to claim 1, characterised in that it comprises a means of implementing a behavioural detail level.

22. An automatic method according to claim 1, characterised in that it comprises a convergent adaptation mechanism irrespective of the nature of the learning signal.

23. An automatic method according to claim 22, characterised in that learning is carried out by a stochastic process based on the FISK distribution.

24. An automatic method according to claim 1, characterised in that it comprises means of grouping and recording memories consisting of information corresponding to perceptions or to calculation tree results.

25. An automatic method according to claim 24, characterised in that it comprises a step of grouping memories in the form of strata.

26. An automatic method according to claim 25, characterised in that it comprises means of connection between the memories and the actuators of the stratum.

27. An automatic method according to claim 26, characterised in that the connection is performed by virtue of generic calculation trees, common to all the memories and using the information of the memory.

28. An automatic method according to claim 24, characterised in that it comprises a recognition step consisting of selecting the active memories.

29. An automatic method according to claim 28, characterised in that it comprises an operation of creating a new memory in the case of absence of perfect recognition.

30. An automatic method according to claim 28, characterised in that it comprises an operation of updating the active memories by replacing the memorised information by the state of the calculated information.

31. An automatic method according to claim 30, characterised in that it comprises an operation of calculating the reliability of the information of the updated memories.

32. An automatic method according to claim 24, characterised in that it comprises means of linking between the memories for the creation of influences between the memories.

33. An automatic method according to claim 32, characterised in that it comprises a step of propagating influences between the memories by means of links.

34. An automatic method according to claim 33, characterised in that it comprises optimisation of updates of influences limited to the influences which have undergone a change.

35. An automatic method according to claim 33, characterised in that it comprises a step of transmitting modified information to the rest of the decision model.

36. An automatic method according to claim 35, characterised in that it comprises a means of transmitting modified information by the creation of a virtual object.

37. An automatic method according to claim 35, characterised in that it comprises a means of transmitting modified information by overloading the result of a processing block.

38. An automatic method according to claim 33, characterised in that it comprises a mechanism for automatic management of the number of links used consisting of deleting the least useful link.

39. An automatic method according to claim 24, characterised in that it comprises a mechanism for automatic management of the number of memories used consisting of deleting the least useful memory.

40. An automatic method according to claim 39, characterised in that said mechanism for automatic management of the number of memories can be customised at the design stage.

* * * * *